(12) United States Patent  
Gurtatowski et al.

(10) Patent No.: US 8,162,375 B2
(45) Date of Patent: Apr. 24, 2012

(54) HINGE MOUNTED FUEL HOUSING SEAL

(75) Inventors: Craig W. Gurtatowski, Crown Point, IN (US); Joseph L. Rodawold, Jr., Wilmington, IL (US); Jacob S. Woodworth, Lowell, IN (US)

(73) Assignee: Illinois Tool Works Inc., Glenview, IL (US)

( * ) Notice: Subject to any disclaimer, the term of this patent is extended or adjusted under 35 U.S.C. 154(b) by 502 days.

(21) Appl. No.: 12/349,126

(22) Filed: Jan. 6, 2009

(65) Prior Publication Data

US 2009/0189410 A1 Jul. 30, 2009

Related U.S. Application Data

(60) Provisional application No. 61/023,549, filed on Jan. 25, 2008, provisional application No. 61/045,659, filed on Apr. 17, 2008.

(51) Int. Cl.
*B60K 15/05* (2006.01)
(52) U.S. Cl. ..................................... 296/97.22
(58) Field of Classification Search ............... 296/97.22
See application file for complete search history.

(56) References Cited

U.S. PATENT DOCUMENTS

| | | | | |
|---|---|---|---|---|
| 2,708,594 A * | 5/1955 | MacPherson | ............... | 296/97.22 |
| 4,142,756 A * | 3/1979 | Henning et al. | ............ | 296/97.22 |
| 4,811,984 A * | 3/1989 | Hempel | ...................... | 296/97.22 |
| 4,917,404 A * | 4/1990 | Pasquali et al. | ............... | 280/853 |
| 4,971,382 A * | 11/1990 | Ohno | .......................... | 296/97.22 |
| 5,072,986 A * | 12/1991 | Tai et al. | ..................... | 296/97.22 |
| 5,076,622 A * | 12/1991 | Detweiler | ...................... | 292/201 |
| 5,253,920 A * | 10/1993 | Eldridge | .................... | 296/97.22 |
| 5,467,621 A * | 11/1995 | Gravino | ......................... | 70/171 |
| 5,658,036 A * | 8/1997 | Benoist | ....................... | 296/97.22 |
| 5,664,811 A * | 9/1997 | Martus et al. | ................. | 292/144 |
| 5,954,387 A * | 9/1999 | Fisher | ......................... | 296/97.22 |
| 6,220,064 B1 * | 4/2001 | Oddenino | ........................ | 70/169 |
| 6,755,057 B2 * | 6/2004 | Foltz | ............................... | 70/159 |
| 6,877,632 B2 * | 4/2005 | Gerdes | ................................ | 220/303 |
| 7,311,348 B1 * | 12/2007 | Bang | ........................... | 296/97.22 |
| 7,390,048 B2 * | 6/2008 | Yoshimura | ................. | 296/97.22 |
| 7,677,631 B1 * | 3/2010 | Zischke et al. | ............. | 296/97.22 |
| 8,002,937 B2 * | 8/2011 | Markyvech et al. | ........ | 156/275.5 |
| 2007/0046062 A1 * | 3/2007 | Yoshimura | ................. | 296/97.22 |
| 2008/0136210 A1 * | 6/2008 | Scott et al. | .................. | 296/97.22 |
| 2010/0006218 A1 * | 1/2010 | Markyvech et al. | ........ | 156/275.5 |
| 2010/0072774 A1 * | 3/2010 | Bar | ............................. | 296/97.22 |

* cited by examiner

*Primary Examiner* — H Gutman

(74) *Attorney, Agent, or Firm* — Mark W. Croll; Paul F. Donovan

(57) ABSTRACT

A vehicle refueling assembly includes a housing through which an inlet pipe is accessed and a door assembly that can be opened and closed relative to the housing. The door assembly includes a hinge and a decorative panel. The hinge includes a seal received in a ledge of the housing when the door assembly is closed.

20 Claims, 4 Drawing Sheets

HINGE MOUNTED FUEL HOUSING SEAL

CROSS-REFERENCE TO RELATED APPLICATIONS

The present regular United States patent application claims the benefits of U.S. Provisional Application Ser. No. 61/023,549 filed on Jan. 25, 2008 and of U.S. Provisional Application Ser. No. 61/045,659 filed on Apr. 17, 2008.

FIELD OF THE INVENTION

The present invention relates to fuel systems for motor vehicles and, more specifically, the invention pertains to fuel pipe and housing assemblies of the fuel system and seals for protecting fuel in the fuel system from contaminants.

BACKGROUND OF THE INVENTION

Fuel systems for motor vehicles are known to include a fuel tank and a filler tube having an inlet through which fuel is dispensed into the tank. It is known to use a removable cap at the end of the filler tube to close the tube. It is known also to use a movable damper and a rubber seal to close the fuel system either as the primary shutoff valve or as a secondary, supplemental shut-off structure. Capless refueling systems are known, wherein a screw-on cap is not required, and the act of inserting a filler nozzle opens the inlet end of the tube for filling by moving a stopper that closes the end of the tube.

The filler tube inlet, whether of a capless or capped design, is known to be contained within a housing that surrounds the inlet, forming a boxlike area around the inlet. An external door is provided on the housing, and can be opened and closed to provide access to the filler tube inlet. The door is a multi-piece assembly that has an exterior ornamental outer door panel snap fit to a supporting structure forming the hinge. The ornamental outer structure complements the exterior surface of the vehicle body to provide an aesthetically pleasing appearance. It is not uncommon for a gap to exist between the fuel housing door panel and the mating housing structure. As a result, debris such as water, dirt, ice and the like may find its way into the fuel housing boxed in area around the filler tube inlet. The cap or other closure at the end of the filler tube inlet prevents the contaminant material from entering the filler tube so that vehicle operation is not adversely affected from contaminants in the fuel.

In a capped fuel system inlet, the cap is designed to keep contaminants away from the inlet end of the filler tube, and the act of removing the cap moves any debris that has accumulated on the cap away from the inlet area. Accordingly, a refueling nozzle can be inserted into the filler tube without carrying significant debris or contaminants with it. However, capless refueling systems are gaining acceptance to simplify and speed up refueling operations, and to eliminate the need for vehicle operators to handle a dirty fuel cap during a refueling operation. A disadvantage of not having a cap is that contaminants that enter the housing area can accumulate on the end of the filler tube inlet, specifically on the outer surface of the sliding structures that are moved out of the way when a refueling nozzle is inserted. In a capless design, contaminants are prevented from entering the inlet nozzle during normal vehicle operation, but can be pushed into the inlet tube by the filler nozzle when the nozzle is inserted for refueling. Attempts to seal the door panel against the housing structure have not been effective in that the sealing relationship is difficult to establish and maintain and can make the access door difficult to open.

What is needed in the art is structure to effectively seal and protect a fuel system refueling housing from intrusion of contaminants without making the access door of the housing difficult to operate.

SUMMARY OF THE INVENTION

The present invention provides a fuel system housing to contain the filler tube inlet, with a hinged door on the housing having a seal on the inner hinge structure to prevent intrusion of contaminants into the housing interior.

In one aspect of one form thereof, the present invention provides a vehicle fuel system refueling assembly with a housing having an interior, an inlet pipe having an end accessible through the housing, and a door assembly pivotally connected to the housing. The door assembly includes a hinge and an outer panel connected to the hinge. A seal is provided between the hinge and the housing.

In another aspect of another form thereof, the present invention provides a door assembly for a vehicle refueling system housing with a hinge having an arm with a pivotal connection, and a panel support structure. An outer panel is connected to the panel support structure. A flange is provided around the support structure, and a seal is attached to the flange for engaging the housing.

In a still further aspect of a still further form thereof, the present invention provides a refueling assembly in a vehicle body member with a housing having a ledge, and a door assembly pivotally connected to the housing. The door assembly has an arm and a support structure. A seal on the support structure sealingly engages the ledge with the door assembly in a closed position. A decorative body panel is connected to the support structure, the body panel being spaced from the housing with the door assembly in a closed position.

An advantage of one form of the invention is providing a sealed housing around capless refueling inlets of motor vehicle fuel systems.

Another advantage of another form of the invention is providing a fuel system inlet housing for vehicles that provides an effective barrier against contaminants including dirt, rain and snow that is easy to operate.

Other features and advantages of the invention will become apparent to those skilled in the art upon review of the following detailed description, claims and drawings in which like numerals are used to designate like features.

Figure 1:
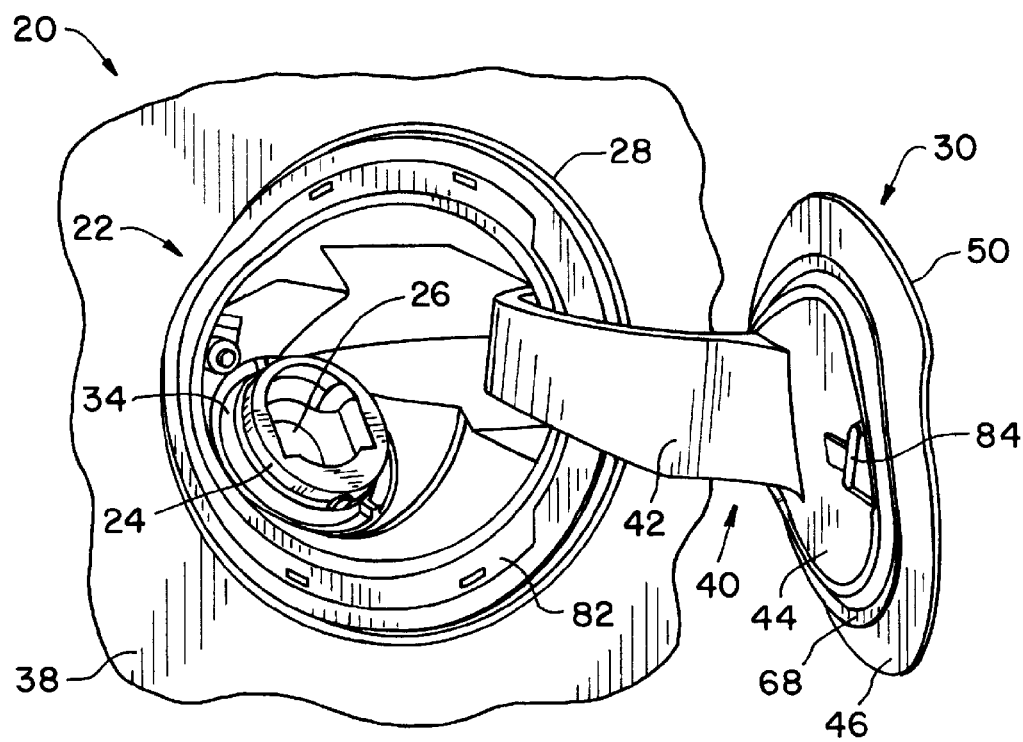
FIG. 1 is a fragmentary perspective view of a vehicle and fuel system inlet housing; with the housing door shown in an open condition to expose the filler tube inlet.
Figure 2:
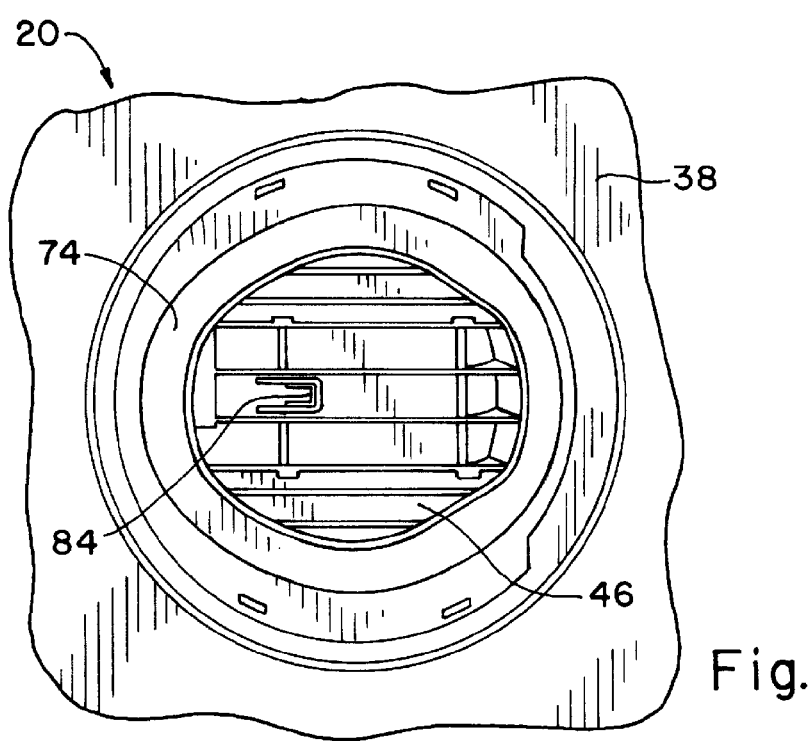
FIG. 2 is a fragmentary view of the structure is shown in FIG. 1, but with the outer door panel removed to show the inner hinge structure in a closed condition.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a fragmentary portion of a vehicle 20 is shown having a refueling assembly 22 therein. Refueling assembly 22 includes an inlet pipe 24 having a shut off 26. Inlet pipe 24 is provided in flow communication with a vehicle fuel tank (not shown) to establish a path for dispensing fuel into the tank from a refueling pump. A refueling nozzle (not shown) is inserted through the distal end of inlet pipe 24, which action opens shut off 26 as the nozzle is inserted therethrough. The distal end of inlet pipe 24 is accessed within a housing 28 having a door assembly 30 that can be opened and closed to expose and cover the end of inlet pipe 24.

It should be understood that the structures shown in the drawings are exemplary, and the forms and shapes of housing 28 and door assembly 30, as well as the location for inlet pipe 24 within housing 28 can be different from that shown. For example, while a generally round housing 28 and door assembly 30 are shown, rectangular structures also can be used. The seal arrangement to be described herein can be used for both capped and capless refueling systems to effectively prevent contaminants from entering the housing. Accordingly, the configuration at the distal end of inlet pipe 24, including the configuration of shutoff 26, can be substantially different from that shown. A cap (not shown) can be provided on the end of inlet pipe 24 within housing 28, or refueling assembly 22 can be of a capless design.

Figure 4:
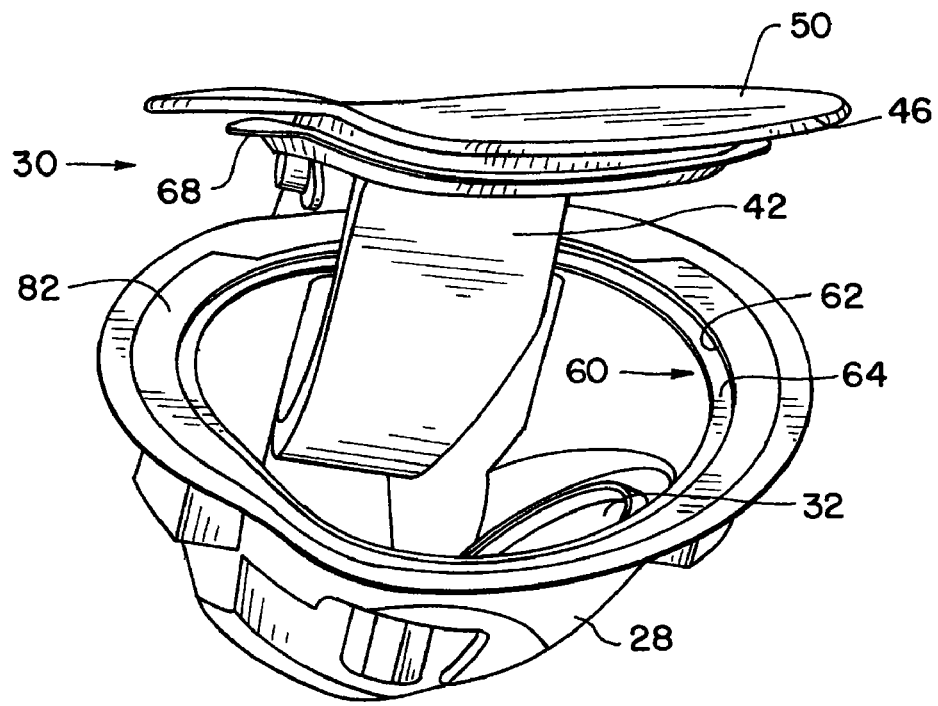
FIG. 4 is a perspective view of the fuel system housing, with the door assembly thereof partially opened
Figure 5:
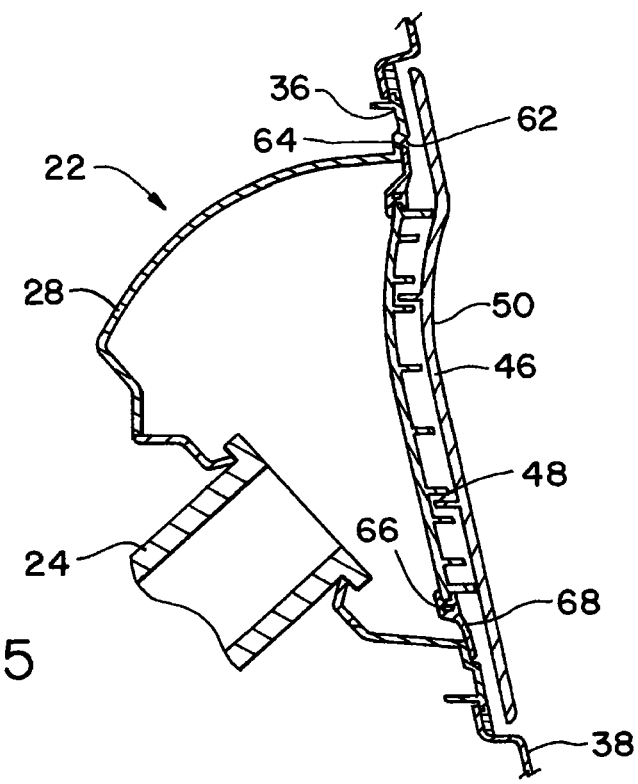
FIG. 5 is a cross-sectional view of the housing with the door closed.

Housing 28 defines an enclosed area having an opening 32 (FIG. 4) thereto for receiving the distal end of inlet pipe 24. A pipe seal 34 can be used around inlet pipe 24 within opening 32 to contain and redirect spills of fuel or other contaminants that may enter housing 28. Housing 28 can be constructed of various different materials including plastics or metals. For example, glass filled nylons are suitable materials that can be molded into desired shapes and configurations for housing 28. Housing 28 includes a flange 36 (FIG. 5) that is attached to a fender or other body member 38 of vehicle 20 by known mounting techniques.

Door assembly 30 is pivotally held in housing 28 and includes a hinge 40 having an arm 42 and a supporting structure 44. A decorative outer door panel 46 is attached to supporting structure 44 by snap fit configurations 48 (FIG. 5) or by other suitable attachment means. Generally, decorative outer door panel 46 will be selected with respect to fender or body member 38 to provide an aesthetically pleasing appearance. Outer door panel 46 can be provided the same color as fender or body member 38 and with a curved or otherwise shaped outer surface 50 to conform to the shape of the area of body member surrounding it, and thereby provide a smooth blended appearance along the surface of the vehicle. Housing 28 can be slightly inset at flange 36 so that outer surface 50 transitions smoothly to body member 38, as seen most clearly in FIG. 5. Outer panel 46 also can be provided as a contrasting or accent panel of a decorative nature.

Figure 3:
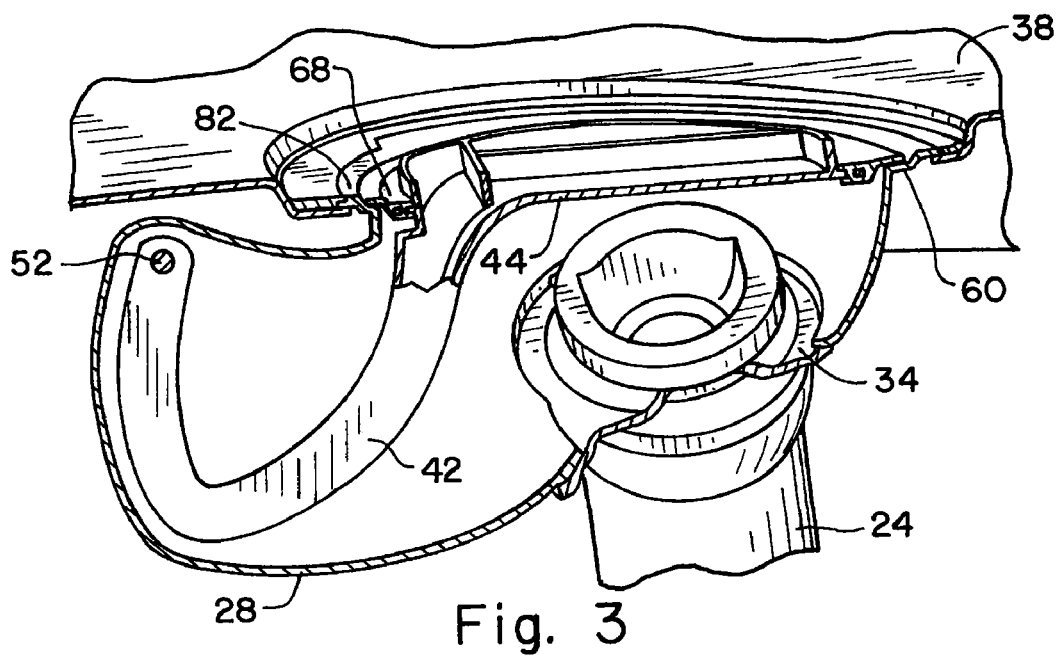
FIG. 3 is a perspective view of the vehicle fuel system of FIG. 2, partially broken away to show the housing with the housing door structure closed.

Hinge 40 is connected pivotally within housing 28 at a pivot connection 52 (FIG. 3), and is shaped together with the shape of housing 28 and body member 38 so as to pivot outwardly and away when opened so that full access is provided to the interior of housing 28 and inlet pipe 24 exposed therein. Door assembly 30 in the opened position is shown in FIG. 1.

Housing 28 and hinge 40 are configured one with respect to the other to provide an effective seal there between independently from outer panel 46 attached to supporting structure 44 of hinge 40. Accordingly, housing 28 defines a ledge 60 along the inner perimeter thereof. Ledge 60 includes a side 62 and a floor 64. Supporting structure 44 defines an outer flange 66 carrying a seal 68 thereon, with seal 68 being shaped and configured to engage ledge 60 in a sealing relationship to inhibit ingress of water dirt or other contaminants when door assembly 30 is closed. Seal 68 can be made of suitable sealing materials such as, for example, various synthetic elastomers, such as TPE (thermoplastic elastomer) or the like.

It is desirable that the seal 68 is securely fixed to flange 66 to remain connected thereto throughout repeated openings and closings of door assembly 30. Depending on the compatibility of materials used for supporting structure 44, chemical bonds required for the effective use of adhesives may not be suitable. Accordingly, it is desirable that seal 68 mechanically engage flange 66 so as not to become dislodged therefrom even when door assembly 30 is opened and closed under adverse conditions of snow, ice or temperature variations. To provide a mechanical interlock of seal 68 and flange 66, holes or openings 70 are provided in flange 66, and seal 68 is formed in an over-molding process by forming directly in place on flange 66. Accordingly, material of seal 68 will flow into and fill holes or openings 70, forming pillars 72 within holes 70 that interconnect surface layers 74 and 76 of seal 68 on opposite sides of flange 66.

In the exemplary embodiment shown, the structure of pillars 72 interconnecting surface layers 74 and 76 on opposite sides of flange 66 forms a base from which a thinner, more flexible lip 78 extends. In the exemplary embodiment shown, lip 78 includes an inwardly curved tip portion 80. It should be understood that pillars 72, surface layers 74 and 76 and lip 78 are a monolithic structure in the exemplary embodiment, formed in a single overmolding process. However, multiple shot overmolding techniques also could be used to provide multiple layers of similar or different materials as desired for the seal to be created.

Figure 6:
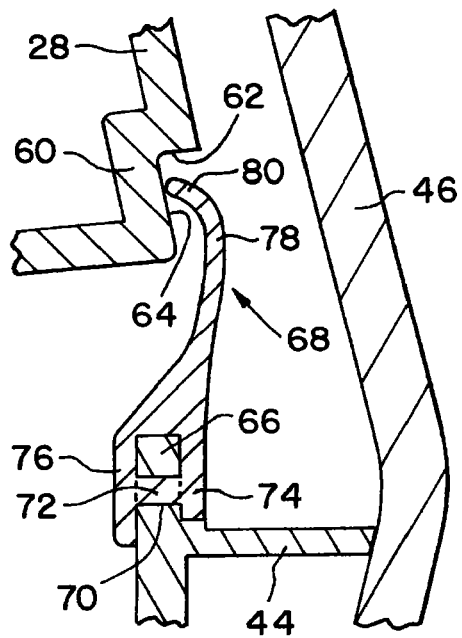
FIG. 6 is an enlarged, fragmentary cross-sectional view of the seal in the housing structure during closing but not fully closed.
Figure 7:
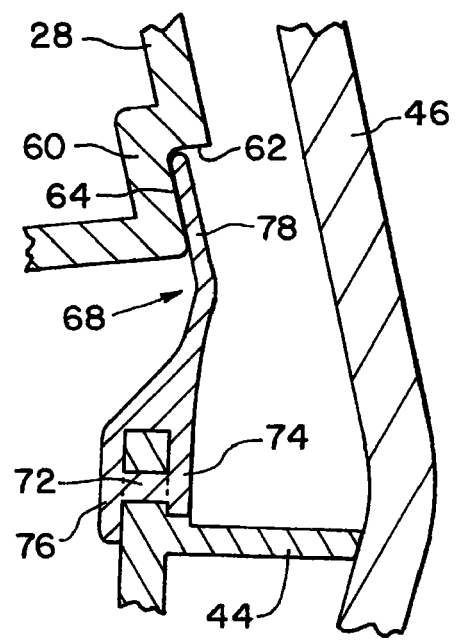
FIG. 7 is an enlarged cross-sectional view of the seal shown in FIG. 6, but with the door shown fully closed.
Figure 8:
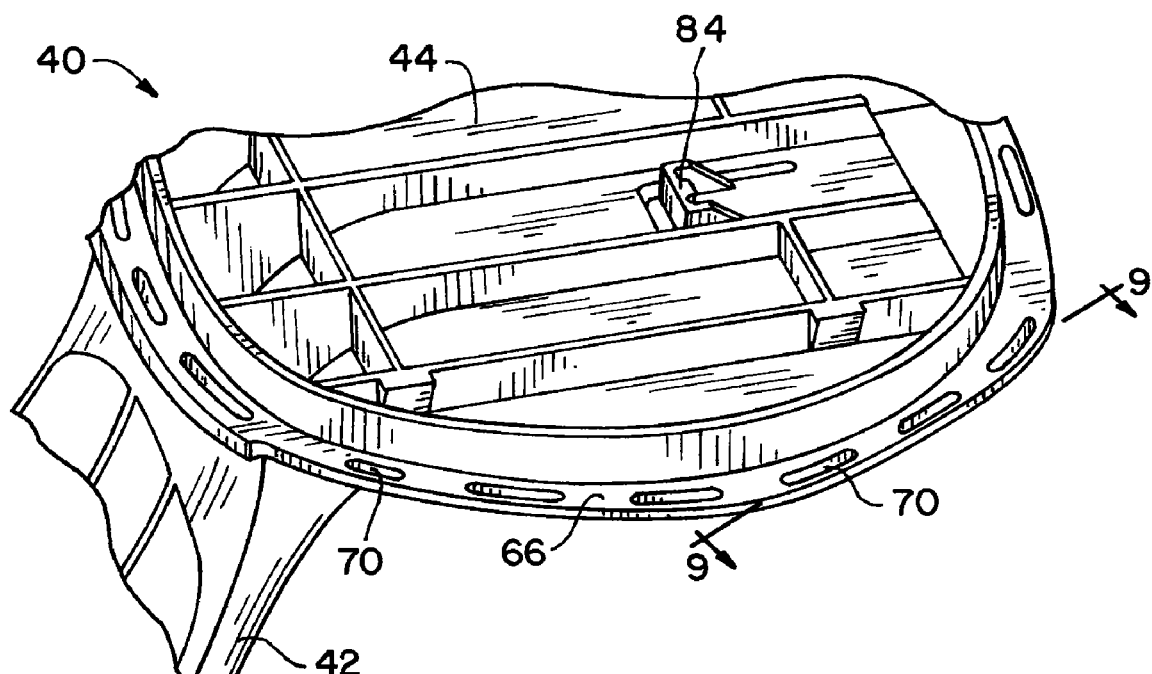
FIG. 8 is a fragmentary perspective view of the hinge for the door assembly before a seal is applied thereto.
Figure 9:
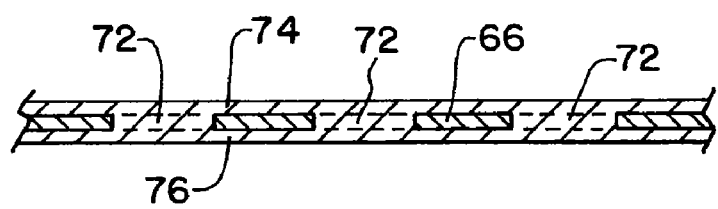
FIG. 9 is a cross-sectional view along line 9-9 of FIG. 8, but with a seal shown installed on the door assembly hinge flange.

Lip 78 is sufficiently soft and pliable to confront and conform against ledge 60 by flattening against the ledge. To facilitate proper orientation and positioning of lip 78 as door assembly 30 is closed, ledge 60 can be provided with tapered, lead in surfaces 82 along the first area of contact for seal lip 78 when door assembly 30 is moved to a closed position. Guide surfaces 82 guide and direct lip 78 so as to flatten and not bend under itself. Further, lip 78 can be provided with the aforementioned curved tip 80 which curves inwardly so as to contact floor 64 at an intermediate portion and flatten and slide outwardly as door assembly 30 is completely closed. Accordingly, a scrubbing action is provided along floor 64 by the edge of seal lip 78 to provide a cleaning action for consistent sealing. Further, when door assembly 30 is completely closed, lip 78 overlies floor 64 and at its outermost edge abuts against side 62. Accordingly, two zones of sealing are provided to inhibit contaminant intrusion, a first zone established by lip 78 overlying floor 64, and a second zone established by the edge of lip 78 abutting against side 62. FIGS. 6 and 7 respectively show curved seal tip 80 at initial contact against floor 64, and the final positioning and flattening of seal lip 78 within ledge 60 when door assembly 30 is fully closed.

A push to close, push to open or other known latch mechanism 84 can be used to hold door assembly 30 in the closed position. Door assembly 30 remains easy to open and easy to close in that high spring force is not required to establish an effective seal. Further, from the sealed position, the sealing relationship is easily released as soon as door assembly 30 is moved slightly outwardly and the seal begins moving away from the ledge.

The structure described above effectively seals the housing against contaminant intrusion regardless of the form or configuration for outer door panel 46. Accordingly, outer door panel 46 can be of complex curved shapes to fit smoothly in the styling for the body of automobile 20, and the shape thereof need not be compromised to provide an effective seal. Further, since housing 28 and door assembly 30 can be installed in various types of automobile bodies, fewer different types need be provided in assembly or repair facilities. The seal does not interfere with adjustments of the outer panel relative to the hinge. The seal is protected and shielded by the outer panel, which extends outwardly beyond the seal. Accordingly, the seal is less likely to be infiltrated by air or water pressure than a seal around the perimeter of the decorative panel. The seal is also shielded from potential freezing moisture due to its location. The seal does not rely on compression or compaction of seal material. Therefore, high spring force, which can be difficult to overcome when opening a door assembly, is not required to effectively establish the seal in position.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A vehicle fuel system refueling assembly, comprising:
a housing having an interior;
an inlet pipe having an end accessible through said housing;
a door assembly pivotally connected to said housing, said door assembly including a hinge and an outer panel connected to said hinge; and
a seal between said hinge and said housing.

2. The refueling assembly of claim 1, said seal being connected to said hinge.

3. A vehicle fuel system refueling assembly, comprising:
a housing having an interior;
an inlet pipe having an end accessible through said housing;
a door assembly pivotally connected to said housing, said door assembly including a hinge and an outer panel connected to said hinge;
a seal between said hinge and said housing, said seal being connected to said hinge; and
said hinge having a flange and said seal having surface layers on opposite sides of said flange.

4. The refueling assembly of claim 3, said flange having holes therethrough, and said seal having pillars extending between said surface layers through said holes.

5. The refueling assembly of claim 4, said seal having a lip projecting outwardly from said flange.

6. The refueling assembly of claim 5, said lip having an outer tip curved inwardly toward said housing interior.

7. A vehicle fuel system refueling assembly, comprising:
a housing having an interior;
an inlet pipe having an end accessible through said housing;
a door assembly pivotally connected to said housing, said door assembly including a hinge and an outer panel connected to said hinge;
a seal between said hinge and said housing; and
said housing having a ledge engaging said seal, and said seal being connected to said hinge.

8. The refueling assembly of claim 7, said housing having a sloped surface adjacent said ledge.

9. The refueling assembly of claim 7, said ledge having a side and a bottom, and said seal having a flexible lip engaging said bottom and said side.

10. The refueling assembly of claim 9, said hinge having a flange and said seal having surface layers on opposite sides of said flange.

11. The refueling assembly of claim 10, said flange having holes therethrough, and said seal having pillars extending between said surface layers through said holes.

12. The refueling assembly of claim 11, said seal having a lip projecting outwardly from said flange.

13. The refueling assembly of claim 12, said lip having an outer tip curved inwardly with said door assembly in an opened position relative to said housing.

14. A door assembly for a vehicle refueling system housing, said door assembly comprising:
a hinge having an arm with a pivotal connection, and a panel support structure;
an outer panel connected to said panel support structure;
a flange around said support structure;
a seal attached to said flange for engaging the housing.

15. The door assembly of claim 14, said flange having holes therethrough, and said seal being a monolithic body having portions on opposite sides of said flange and extending through said holes.

16. The door assembly of claim 14, said seal having a flexible, outwardly extending lip.

17. The door assembly of claim 16, said lip having a curved outer tip.

18. The door assembly of claim 17, said flange having holes therethrough, and said seal being a monolithic body having portions on opposite sides of said flange and extending through said holes.

19. A refueling assembly in a vehicle body member, said refueling assembly comprising:
a housing having a ledge;
a door assembly pivotally connected to said housing;
said door assembly having an arm and a support structure;
a seal on said support structure sealingly engaging said ledge when said door assembly is in a closed position; and
a decorative body panel connected to said support structure, said body panel being spaced from said housing with said door assembly in said closed position.

20. The refueling assembly of claim 19, said seal including a flexible lip having a curved outer tip.

* * * * *